(12) United States Patent
Mattsson et al.

(10) Patent No.: US 12,093,420 B2
(45) Date of Patent: Sep. 17, 2024

(54) DATA TOKENIZATION AND SEARCH IN A DISTRIBUTED NETWORK

(71) Applicant: Protegrity Corporation, Grand Cayman (KY)

(72) Inventors: Ulf Mattsson, Cos Cob, CT (US); David Clyde Williamson, Great Missenden (GB)

(73) Assignee: PROTEGRITY US HOLDING, LLC, Stamford, CT (US)

( * ) Notice: Subject to any disclaimer, the term of this patent is extended or adjusted under 35 U.S.C. 154(b) by 328 days.

(21) Appl. No.: 17/492,591

(22) Filed: Oct. 2, 2021

(65) Prior Publication Data
US 2022/0121768 A1   Apr. 21, 2022

Related U.S. Application Data

(60) Provisional application No. 63/163,554, filed on Mar. 19, 2021, provisional application No. 63/093,000, filed on Oct. 16, 2020.

(51) Int. Cl.
*G06F 21/00* (2013.01)
*G06F 16/22* (2019.01)
*G06F 16/245* (2019.01)
*G06F 21/62* (2013.01)

(52) U.S. Cl.
CPC ........ *G06F 21/6227* (2013.01); *G06F 16/221* (2019.01); *G06F 16/245* (2019.01)

(58) Field of Classification Search
CPC .. G06F 21/6227; G06F 16/221; G06F 16/245; G06F 16/2255; G06F 16/2272; G06F 16/24526
See application file for complete search history.

(56) References Cited

U.S. PATENT DOCUMENTS

| | | | |
|---|---|---|---|
| 5,347,632 A | 9/1994 | Filepp et al. | |
| 8,359,326 B1 * | 1/2013 | Garg | G06F 16/951 |
| | | | 707/765 |
| 9,081,978 B1 | 7/2015 | Connolly et al. | |
| 9,237,006 B2 | 1/2016 | Mattsson et al. | |
| 9,442,980 B1 | 9/2016 | Trepetin et al. | |
| 9,973,475 B2 | 5/2018 | Jain et al. | |
| 10,108,605 B1 | 10/2018 | Leighton | |

(Continued)

OTHER PUBLICATIONS

International Search Report and Written Opinion, Patent Cooperation Treaty Application No. PCT/US2022/014171, Apr. 27, 2022, 29 pages.

(Continued)

*Primary Examiner* — Michael M Lee
(74) *Attorney, Agent, or Firm* — Fenwick & West LLP

(57) ABSTRACT

Data in a database can be protected, for instance by tokenizing the entries of the database using one or more token tables. To enable searching data within the database without first detokenizing the tokenized database entries, bigrams of each data entry can also be tokenized and stored in association with the tokenized data entry. When a query term is received, the query term can be parsed into bigrams, and each bigram can be tokenized. The tokenized query bigrams can be used to query the database, and tokenized database entries corresponding to tokenized bigrams that match the tokenized query bigrams can be identified and returned as search results.

21 Claims, 9 Drawing Sheets

(56) References Cited

U.S. PATENT DOCUMENTS

| | | |
|---|---|---|
| 2002/0046201 A1 | 4/2002 | Hembry |
| 2004/0044878 A1 | 3/2004 | Evans et al. |
| 2011/0154467 A1 | 6/2011 | Bomar et al. |
| 2013/0007077 A1 | 1/2013 | Wegener |
| 2013/0007078 A1 | 1/2013 | Wegener |
| 2013/0060827 A1 | 3/2013 | Wegener |
| 2013/0091143 A1* | 4/2013 | Raemy ............ G06Q 10/06395 707/748 |
| 2013/0103685 A1 | 4/2013 | Preneel et al. |
| 2014/0090081 A1* | 3/2014 | Mattsson ............ G06F 21/6227 726/27 |
| 2014/0208068 A1 | 7/2014 | Wegener |
| 2016/0299882 A1* | 10/2016 | Hegerty ................ G06F 40/232 |
| 2017/0053138 A1 | 2/2017 | Rozenberg et al. |
| 2017/0063533 A1 | 3/2017 | Barham et al. |
| 2019/0158288 A1* | 5/2019 | Williamson ........ G06F 21/6218 |
| 2020/0250338 A1 | 8/2020 | McFall et al. |
| 2021/0019309 A1* | 1/2021 | Yadav ................ G06F 16/2428 |

OTHER PUBLICATIONS

Srikanth, "Parallel lexical analyzer on the cell processor," 2010 Fourth International Conference on Secure Software Integration and Reliability Improvement Companion, IEEE, 2010, Jun. 11, 2010, pp. 28-29, Retrieved on Apr. 2, 2022 from <https://ieeexplore.ieee.org/abstract/document/5521554>.

Tan et al., "Mind your Inflections! Improving NLP for non-standard Englishes with Base-Inflection Encoding," arXiv preprint arXiv:2004.14870 (2020), Nov. 18, 2020, 17 pages, Retrieved on Apr. 2, 2022 from <https://arxiv.org/pdf/2004.14870.pdf>.

United States Office Action, U.S. Appl. No. 17/581,070, Jan. 12, 2024, 25 pages.

United States Office Action, U.S. Appl. No. 17/581,068, Jan. 24, 2024, 95 pages.

* cited by examiner

| Input character 305 | UTF-8 code value 310 | Token Column 315 | Token Column 320 | Token Column 325 |
|---|---|---|---|---|
| a | 0061 | E29E | 5055 | 782B |
| b | 0062 | 72A1 | 4CEF | 2441 |
| c | 0063 | B800 | A2C4 | A326 |
| ... | ... | ... | ... | ... |
| त | 0A08 | 8814 | 0BB8 | 26D2 |
| ਉ | 0A09 | 9C36 | 502D | 904F |
| ਕ | 0A10 | BEB1 | DE31 | 0C3E |
| ... | ... | ... | ... | ... |
| ㋑ | A2B6 | 0761 | 17A3 | FF01 |
| ㋒ | A2B7 | B82E | 46EA | 8B3F |
| ㋓ | A2B8 | A194 | 4AB9 | 257A |
| ... | ... | ... | ... | ... |

FIG. 3

DATA TOKENIZATION AND SEARCH IN A DISTRIBUTED NETWORK

CROSS REFERENCE TO RELATED APPLICATIONS

The application claims the benefit of Provisional Application No. 63/093,000, filed on Oct. 16, 2020, and Provisional Application No. 63/163,554, filed Mar. 19, 2021, the contents of which are incorporated herein by reference.

FIELD OF ART

This application relates generally to the field of data protection, and more specifically to the tokenization of data in a distributed network environment.

BACKGROUND

Data stored in a database or other data source can be searched through keyword queries. However, once data is encoded and thus protected within the database (e.g., via encryption, tokenization, and the like), the data no longer becomes searchable without first decoding the data. This presents a security risk, particularly for sensitive data, as the raw, unprotected data is potentially exposed to unauthorized entities when decoded. Accordingly, there is a need to enable the accessing and searching of protected data without first decoding the data. Likewise, simply encoding a query term and comparing the encoded query term to stored encoded query data prevents similar but not exact (e.g., due to misspelled query terms, to variances in term spelling, to multi-term searches) search results from being presented to a user, thus limiting the utility of such a search.

SUMMARY

Data in a database can be protected, for instance by tokenizing the entries of the database using one or more token tables. To enable searching data within the database without first detokenizing the tokenized database entries, bigrams of each data entry can also be tokenized and stored in association with the tokenized data entry. When a query term is received, the query term can be parsed into bigrams, and each bigram can be tokenized. The tokenized query bigrams can be used to query the database, and tokenized database entries corresponding to tokenized bigrams that match the tokenized query bigrams can be identified and returned as search results.

BRIEF DESCRIPTION OF DRAWINGS

FIG. 3 illustrates an example Unicode token table, according to one embodiment.

Figure 1:
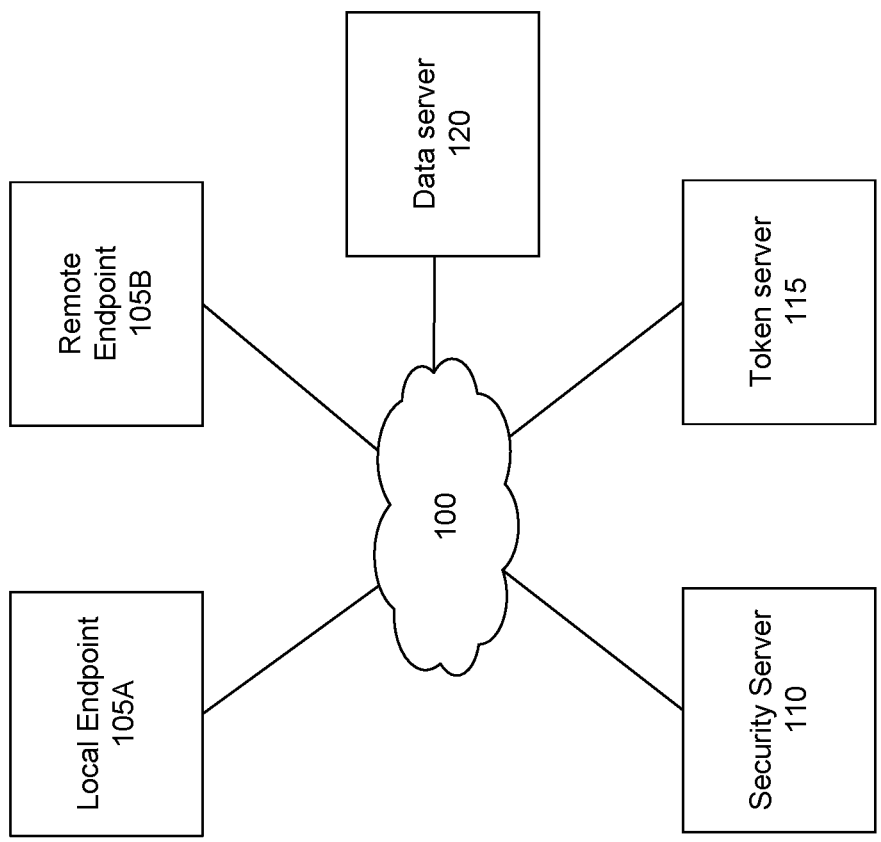
FIG. 1 illustrates an example distributed tokenization environment, according to one embodiment.

The figures depict embodiments for purposes of illustration only. One skilled in the art will readily recognize from the following description that alternative embodiments of the structures and methods illustrated herein may be employed without departing from the principles of the invention described herein.

DETAILED DESCRIPTION

Tokenization Overview

As used herein, the tokenization of data refers to the generation of tokenized data by querying one or more token tables mapping input values to tokens with one or more portions of the data, and replacing the queried portions of the data with the resulting tokens from the token tables. Tokenization can be combined with encryption for increased security, for example by encrypting sensitive data using a mathematically reversible cryptographic function (e.g., datatype-preserving encryption or format-preserving encryption), a one-way non-reversible cryptographic function (e.g., a hash function with strong, secret salt), or a similar encryption before or after the tokenization of the sensitive data. Any suitable type of encryption can be used in the tokenization of data.

As used herein, the term token refers to a string of characters mapped to an input string of characters in a token table, used as a substitute for the input string of characters in the creation of tokenized data. A token may have the same number of characters as the string being replaced, or can have a different number of characters. Further, the token may have characters of the same type or character domain (such as numeric, symbolic, or alphanumeric characters) as the string of characters being replaced or characters of a different type or character domain. Tokens can be randomly generated and assigned to a particular token table input value.

Any type of tokenization may be used to perform the functionalities described herein. One such type of tokenization is static lookup table ("SLT") tokenization. SLT tokenization maps each possible input value (e.g., possible character combinations of a string of characters, possible input values, etc.) to a particular token. An SLT includes a first column comprising permutations of input string values, and may include every possible input string value. The second column of an SLT includes tokens ("token values"), with each associated with an input string value of the first column. Each token in the second column may be unique among the tokens in the second column. Optionally, the SLT may also include one or several additional columns with additional tokens mapped to the input string values of the first column. In some embodiments, each combination of an input column (the "first" column) and a token column (a column with tokens mapped to input string values) may be considered a distinct token table, despite being co-located within a same table. A seed value can be used to generate an SLT, for instance by generating random numbers based on the seed value for each token in the SLT.

An SLT can be shuffled using a shuffle operation to create a new SLT, for instance by re-ordering the tokens mapped to the input values. The tokens can be re-ordered when shuffling an SLT based on a seed value, such as a randomly generated number value. The seed value can be used to select a token from the tokens of the SLT to map to the first input value, can be used to select a second token from the tokens of the SLT to map to the second input value, etc. For example, the seed value can be used to seed a random number generator which randomly selects token values from the tokens of the SLT for mapping to the input values of the SLT. Likewise, the seed value can be used to modify tokens within the SLT to produce new tokens for the SLT. For instance, the seed value can be used to seed a mathematical function (such as a hash function, modulo addition, multiplication, dot products, and the like) which converts a value of each token to a new value, which are stored within the SLT, replacing the corresponding tokens. Shuffling the values of tokens within a token table produces a shuffled token table, allowing a data storage entity to use a different encoding mechanism (the shuffled token table) without requiring the shuffled token table to be transmitted to the data storage entity (e.g., the shuffled token table can be generated from a token table to which the data storage entity has access). Such embodiments enable the data storage entity to continue to update their security protocols and procedures without requiring the bandwidth associated with transmitting large SLTs and/or without requiring the data storage entity to be communicatively connected to a token server.

In some embodiments, to increase the security of tokenization, sensitive data can be tokenized two or more times using the same or additional token tables. Each successive tokenization is referred to as a "tokenization iteration" herein. For example, the first 4 digits of a Unicode code value can be replaced with a first token value mapped to the first 4 digits by a first token table, digits 2 through 5 of the resulting tokenized Unicode code value can be replaced with a second token value mapped to digits 2 through 5 by a second token table, and so on. Portions of data may be tokenized any number of times, and certain portions of the sensitive data may also be left un-tokenized. Accordingly, certain digits of tokenized data may be tokenized one or more times, and certain digits may not be tokenized.

Dynamic token lookup table ("DLT") tokenization operates similarly to SLT tokenization, but instead of using static tables for multiple tokenization operations, a new token table entry is generated each time sensitive data is tokenized. A seed value can be used to generate each DLT. In some embodiments, the sensitive data or portions of the sensitive data can be used as the seed value. DLTs can in some configurations provide a higher level of security compared to SLT, but can also require the storage and/or transmission of a large amount of data associated with each of the generated token tables. While DLT tokenization can be used to tokenize data according to the principles described herein, the remainder of the description will be limited to instances of SLT tokenization for the purposes of simplicity The security of tokenization can be further increased through the use of initialization vectors ("IVs"). An IV is a string of data used to modify sensitive data prior to or after tokenizing the sensitive data. Example sensitive data modification operations include performing linear or modulus addition on the IV and the sensitive data, performing logical operations on the sensitive data with the IV, encrypting the sensitive data using the IV as an encryption key, and the like. The IV can be a portion of the sensitive data. For example, for a 12-digit number, the last 4 digits can be used as an IV to modify the first 8 digits before tokenization. IVs can also be retrieved from an IV table, received from an external entity configured to provide IVs for use in tokenization, or can be generated based on, for instance, the identity of a user, the date/time of a requested tokenization operation, based on various tokenization parameters, and the like. In some embodiments, IVs can be accessed from other tokenization operations (e.g., the input value used to query a token table or the output, such as a token value or tokenized data, of a token table). As described herein, IVs can be data values accessed from parallel tokenization pipelines. Data modified by one or more IVs that is subsequently tokenized includes an extra layer of security—an unauthorized party that gains access to the token tables used to tokenized the modified data will be able to detokenize the tokenized data, but will be unable to de-modify the modified data without access to the IVs used to modify the data.

As used herein, "tokenization parameters" refers to the properties or characteristics of a tokenization operation. For example, tokenizing data according to tokenization parameters can refer to but is not limited to one or more of the following: the generation of token tables for use in tokenizing the data; the identity of pre-generated token tables for use in tokenizing the data; the type and number of token tables for use in tokenizing the data; the identity of one or more tokens for use in tokenizing the data; the number of tokenization iterations to perform; the type, number, and source of initialization vectors for use in modifying the data prior to tokenization; the portion of sensitive data to be tokenized; and encryption operations to perform on the data before or after tokenization. Tokenization and initialization vectors are described in greater detail in U.S. patent application Ser. No. 13/595,438, titled "Multiple Table Tokenization", filed Aug. 27, 2012, the contents of which are hereby incorporated by reference.

Distributed Tokenization Environment Overview

FIG. 1 illustrates an example distributed tokenization environment, according to one embodiment. The environment of FIG. 1 includes a local endpoint 105A and a remote endpoint 105B, a security server 110, a token server 115, and a data server 120. The entities of FIG. 1 are, include, or are implemented within computing devices and are configured to transmit and receive data through a connecting networking 100. In other embodiments, the tokenization environment illustrated in FIG. 1 can include additional, fewer, or different entities, and the entities illustrated can perform functionalities differently or other than those described herein. For example, in some embodiments the token server 115 is implemented within the security server 110. Further, any number of each type of entity shown in FIG. 1 can be included in various embodiments of a tokenization environment. For example, thousands or millions of endpoints can communicate with one or more security server and/or token server.

The connecting network 100 is typically the Internet, but may be any network, including but not limited to a LAN, a MAN, a WAN, a mobile wired or wireless network, a private network, a virtual private network, a direct communication line, and the like. The connecting network can be a combination of multiple different networks. In addition, the connecting network can be located within any entity illustrated in FIG. 1 in whole or in part, and can include both inner- and inter-entity communication lines.

The local endpoint 105A and the remote endpoint 105B are computing devices, and in some embodiments are mobile devices, such as a mobile phone, a tablet computer, a laptop computer, and the like. An endpoint can also be a traditionally non-mobile entity, such as a desktop computer, a television, an ATM terminal, a ticket dispenser, a retail store payment system, a website, a database, a web server, and the like. Each endpoint includes software configured to allow a user of the endpoint to interact with other entities within the environment of FIG. 1. For example, the endpoint can include a mobile wallet application or other payment application configured to allow a user to use the endpoint to transmit payment information when conducting a transaction, for instance at a store or restaurant. In various embodiments, the local endpoint can generate Unicode data to provide to the remote endpoint, and the data can be first routed to or intercepted by the security server 110 for tokenization, and the security server can tokenize data using a token table received from the token server 115. The tokenized data can then be provided by the security server to the remote endpoint, for instance for storage or processing.

The security server 110 (or "central server") is configured to encode data provided by the local endpoint 105A or the remote endpoint 105B using a tokenization scheme described herein. The security server 110 is described in more detail below. The token server 115 is configured to generate, access, and/or store tokens and token tables, and to provide the tokens and token tables to the security server for use in tokenizing and detokenizing data and generating shuffled token tables. Both the security server and the token server are computing devices configured to perform the functionalities described herein. For example, the security server can receive a token table (such as an SLT) from the token server for use in tokenizing data received from the local endpoint and the remote endpoint.

The data server 120 can include one or more data storage mechanisms, such as a database. The data server 120 stores data received from one or more of the other components of the embodiment of FIG. 1, and provides stored data to a requesting component of the embodiment of FIG. 1. In some embodiments, the token server 115 can protect data stored within the data server 120, for instance by tokenizing data within a database of the data server. It should be noted that in some embodiments, the data server 120 can be incorporated into any of the other components of the embodiment of FIG. 1.

Parallel Unicode Tokenization in a Distributed Environment

Figure 2:
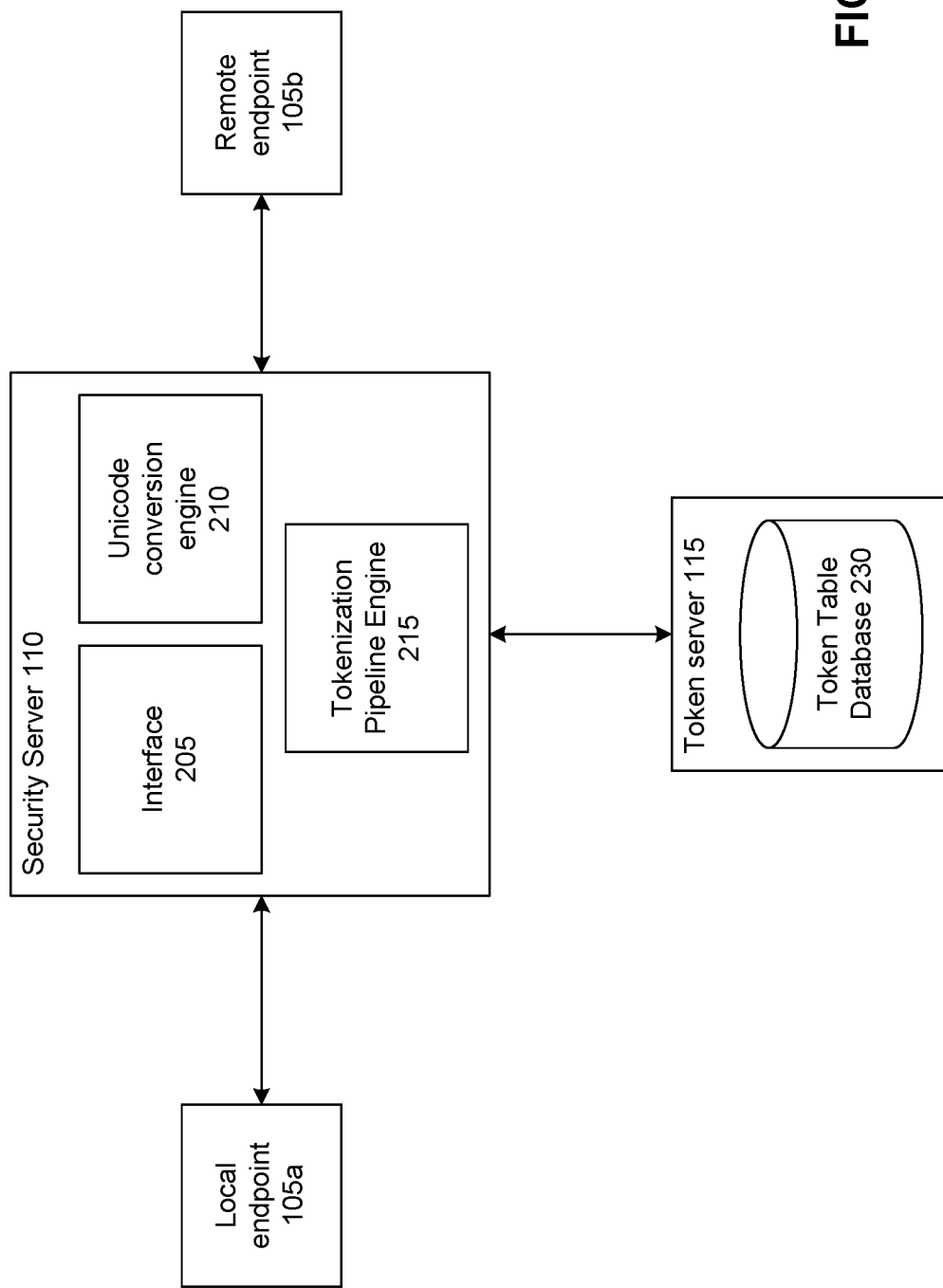
FIG. 2 illustrates dataflow within the distributed tokenization environment of FIG. 1, according to one embodiment.

FIG. 2 illustrates dataflow within the distributed tokenization environment of FIG. 1, according to one embodiment. In the embodiment of FIG. 2, the local endpoint 105a provides data for tokenization in a Unicode format to the security server 110. For instance, the data provided to the security server can be communications data (such as an email body, a Word document, etc.), payment data, an HTML request, media data, and the like. In some embodiments, the information provided to the security server includes characters corresponding to one or more human languages, in a Unicode format corresponding to the one or more human languages. For instance, for a string of English characters, the local endpoint can provide the UTF-8 code values corresponding to the string of English characters to the security server. Alternatively, the local endpoint can provide data to the security server in a plaintext or encrypted format.

In one example, the local endpoint 105a is a web server that provides the contents of a webpage (e.g., text within the webpage, media files associated with the webpage, and HTML data corresponding to the webpage) in a Unicode format for rendering by the remote endpoint 105b. In this example, the security server 110 may be a firewall or gateway server located within the same network as the local endpoint and through which the contents of the webpage are routed. The security server can protect the contents of the webpage, for instance using the parallel tokenization described herein, and can provide the protected contents of the webpage to the remote endpoint for decoding/detokenization and rendering by the remote endpoint.

The security server 110 can access one or more token tables from the token server 115, for instance in advance of or in response to receiving a request for tokenization by the local endpoint 105a, or in response to intercepting or receiving data provided by the local endpoint for transmission to the remote endpoint 105b. In some embodiments, the security server accesses token tables from the token server periodically, in response to an expiration of token tables previously accessed by the security server, in response to a request from an entity associated with the local endpoint or any other component or system of FIG. 2, or in response to any other suitable criteria. It should be noted that although displayed separately in the embodiment of FIG. 2 (e.g., as separate computing systems that may be geographically remote), in practice, the token server may be implemented within the security server.

The token server 115 can generate token tables to immediately provide to the security server 110 (e.g., in response to a request for token tables from the security server), or for storage in the token table database 230 (e.g., for subsequent providing to the security server). Likewise, the token server can access token tables generated by other entities, and can store these token tables or can provide the token tables to the security server.

One type of token table generated, accessed by, or stored by the token server 115 are Unicode token tables. A Unicode token table maps Unicode code values (eg, the binary, hex, or other format values mapped to characters of the various human languages represented by Unicode) to token values. In some embodiments, the Unicode token tables can map Unicode encodings for any Unicode or similar standard, including but not limited to UTF-8, UTF-16, UTF-32, UTF-2, GB18030, BOCU, SCSU, UTF-7, ISO/IEC 8859, and the like. For the purposes of simplicity, reference will be made to UTF-8 herein, though the principals described herein are applicable to any Unicode or similar standard.

The Unicode token tables described herein can map Unicode encodings in any format to token values. In some embodiments, the token values of the Unicode token tables are mapped to Unicode code values in a hexadecimal format, while in other embodiments, the Unicode code values are in a binary format, a decimal format, or any other suitable format. In some embodiments, the Unicode code values of a token table include code points that correspond to human language characters. In other embodiments, the Unicode code values include a combination of code points and suffixes or prefixes. In some embodiments, the Unicode code values include every potential value for a particular format and code value length. In yet other embodiments, the Unicode code values include every potential code value represented by a Unicode or similar standard, or include Unicode code values corresponding only to a subset of the human languages represented by Unicode.

In one embodiment, token tables generated, accessed, or stored by the token server 115 map Unicode code values in a particular character domain to token values selected from Unicode code values corresponding to the character domain. For instance, a token table that includes Unicode code values corresponding to Kanji can map the Unicode code values to token values selected from a set of values that include the Kanji Unicode code values. In other embodiments, token tables generated, accessed, or stored by the token server map Unicode code values in a first character domain to token values selected from Unicode code values corresponding to a second character domain. For instance, a token table that includes Unicode code values corresponding to Hebrew characters can map the code values to token values selected from a set of values that include English Unicode code values. In some embodiments, the token tables generated, accessed, or stored by the token server map Unicode code values to token values that are randomly generated, and are not limited to a particular set of values.

In one implementation, the security server 110 can receive data to be tokenized from the local endpoint 105a. The received data can include only Katakana and Hiragana characters, and the security server can request identify the Katakana and Hiragana languages to the token server 115 in a request for token tables. The token server, in response, can generate Unicode token tables that map token values to Unicode code values for the Katakana and Hiragana character sets. By limiting the character sets included in the requested Unicode token tables, the resulting Unicode token tables are smaller size, decreasing the amount of storage required to store the token tables, decreasing the amount of time required to generate the token tables, and decreasing the amount of time required by the security server to use the token tables to generate tokenized data, thereby improving the performance of one or both of the security server and the token server. It should be noted that in other embodiments, the token server can limit the number of languages represented by generated token tables based on other factors, including an identity of an entity associated with the local endpoint, the remote endpoint 105b, or associated with a request to tokenize data; a geography associated with the local endpoint, the security server, or the remote endpoint; a type of transaction or document associated with a tokenization request; or any other suitable factor.

For example, if a document including information to be tokenized includes English characters, the security server 110 can access Unicode token tables that map token values to Unicode code values corresponding to English characters (and not, for instance, characters of other languages). Likewise, if an entity or individual frequently requests data to be tokenized corresponding to mathematical symbols and Farsi characters, the security server 110 can access Unicode token tables that map token values to these Unicode code values associated with these characters and not the characters of other languages. In another example, if a request to tokenize data is received from a particular jurisdiction associated with one or more languages (for instance, Switzerland, where Swiss and German are frequently spoken), then the security server 110 can access token tables that map token values to the Unicode code values associated with characters of these languages, and not other languages. It should be noted that new token tables can be accessed or generated for each new request to tokenize characters, after a threshold number of requests from a particular entity requesting tokenization, after a passage of a threshold amount of time since token tables were generated or accessed for a particular entity requesting tokenization, or based on any other criteria.

FIG. 3 illustrates an example Unicode token table, according to one embodiment. In the embodiment of FIG. 3, the token table 300 includes a UTF-8 code value column 310, a first token column 315, a second token column 320, and a third token column 325. Although the input character column 305 is shown in FIG. 3, this is merely to illustrate which characters are mapped to the UTF-8 code values included in the UTF-8 code value column, and in practice the Unicode token tables described herein may not include an input character column as illustrated in FIG. 3. In the token table of FIG. 3, the input character "a" corresponds to the UTF-8 code value "0061", and is mapped to the token value "E29E" in the first token column 315, the token value "5055" in the second token column 320, and the token value "782B" in the third token column 325. Likewise, the characters "b", "c", "ई", "ਉ", "ਐ", "ଉ", "ଓ", and "ଓ" each correspond to UTF-8 code values, and are each mapped to different token values in each of the three token columns.

It should be noted that the token table 300 of FIG. 3 includes Unicode code values for every UTF-8 character, though not all such characters are illustrated in FIG. 3 for the purposes of simplicity. It should also be noted that the token table of FIG. 3 includes three token columns. In practice, the token table of FIG. 3 can be considered three separate token tables, each including the UTF-8 code value column 310 and a different one of the token columns. Thus, a first token table can include the UTF-8 code value column and the first token column 315, a second token table can include the UTF-8 code value column and the second token column 320, and a third token table can include the UTF-8 code value column and the third token column 325. The token tables described herein can include any number of token columns, though must include at least one token column. It should be noted that although each token column of FIG. 3 includes token values in hexadecimal, in practice, the token values can be in any form, and need not mirror the format and character set of the Unicode code values.

The security server 110 can use the Unicode token table 300 of FIG. 3 to tokenize data. For instance, if the security server 110 tokenizes the word "belmont", the security server 110 can break apart the word "belmont" into the component letters "b", "e", "L", "m", "o", "n", and "t", and can tokenize each character, for instance by tokenizing the first three letters using a first set of parallel tokenization pipelines and the last four letters using a second set of parallel tokenization pipelines. In a first tokenization step, the security server can convert the letter "b" into the Unicode code value "0062", and can query the token table of FIG. 3 using the Unicode code value "0062" to identify the token value "72A1" mapped to the Unicode code value "0062" by the first token column 315. To complete the first tokenization step, the security server can replace the Unicode code value "0062" with the token value "72A1" before continuing to a next tokenization step. Tokenization using parallel tokenization pipelines is described in greater detail below.

Returning to FIG. 2, the security server 110 includes an interface 205, a Unicode conversion engine 210, and a tokenization pipeline engine 215 (or simply "pipeline engine" hereinafter). In other embodiments, the security server can include additional, fewer, or different components than those illustrated herein. The security server receives data to be tokenized from the local endpoint 105a, accesses token tables from the token server 115, tokenizes the received data using the accessed token tables, and provide the tokenized data to the remote endpoint 105b.

The interface 205 provides a communicative interface between the components of the security server 110, and between the security server and the other systems of the environment of FIG. 2. For instance, the interface can receive data to be tokenized from the local endpoint 105a, can provide the received data to the Unicode conversion engine 210 for conversion into Unicode code values, can route the code values to the pipeline engine 215 for tokenization, and can provide the tokenized data to the remote endpoint 105b. Likewise, the interface can request token tables from the token server 115, and can provide the requested token tables to the pipeline engine for use in tokenizing data. The interface can also generate one or more graphical user interfaces for use in tokenizing data, for instance for display to a user of the local endpoint prior to the local endpoint sending data to be tokenized to the security server, or to a user of the remote endpoint, for instance for displaying the tokenized data.

The Unicode conversion engine 210 converts characters of data to be tokenized (e.g., the received data from the local endpoint 105a) from a character domain associated with the data to be tokenized to Unicode code values. In some embodiments, the converted Unicode code values correspond to a particular Unicode standard. The Unicode standard can be a default Unicode standard, can be selected by the local endpoint or the remote endpoint 105b, can be based on the type of data being tokenized, or can be selected based on any other suitable factor. The resulting Unicode code values are provided to the pipeline engine 215 for use in producing tokenized data. The Unicode conversion engine can convert the tokenized data back to characters in a character domain. For instance, if the tokenized data includes a token value "0079", the Unicode conversion engine can convert the token value to the letter "y" (the character mapped to the Unicode code value "0079" in the UTF-8 standard).

The pipeline engine 215 instantiates one or more tokenization pipelines for use in the parallel tokenization of the data to be tokenized received from the local endpoint 105a. Any number of tokenization pipelines may be generated such that a first value computed within a first pipeline is used to compute a second value within a second pipeline. Each tokenization pipeline includes a number of encoding operations performed in series, including at least one tokenization operation, and each tokenization pipeline performs the encoding operations of the tokenization pipeline in parallel. As used herein, encoding operations other than tokenization operations can be performed using processing engines, and tokenization operations can be performed using tokenization engines. Accordingly, by instantiating the tokenization pipeline, the pipeline engine can instantiate one or more processing engines and one or more tokenization engines within the tokenization pipeline.

The number of tokenization pipelines can be a default number of pipelines, or can be based on any suitable factor. For instance, the number of tokenization pipelines instantiated can be based on the requested tokenization, an entity associated with the local endpoint 105a, an entity associated with the remote endpoint 105b, a type or sensitivity of data to be tokenized, a set of characters associated with the data to be tokenized, a length or number of characters of the data to be tokenized, and the like. The encoding operations included in each tokenization operation can include any type of encoding operation and any number of each type of encoding operation. For instance, the encoding operations can include pre-processing operations, modulo addition operations, encryption operations, combinatorial operations (e.g., combining two or more data values mathematically, concatenating two or more data values, etc.), tokenization operations, and the like. The type and number of each encoding operation can be based on the tokenization request, the entity associated with the local endpoint or remote endpoint, a type or sensitivity of data to be tokenized, a set of characters associated with the data to be tokenized, and the like.

The pipeline engine 215, upon instantiating parallel tokenization pipelines, identifies, for each tokenization pipeline, values computed within the tokenization pipeline to provide to one or more additional pipelines for use in performing the encoding operations of the tokenization pipeline. Likewise, the pipeline engine identifies, for each tokenization pipeline, which values computed within other tokenization pipelines are provided to the tokenization pipeline for use in performing the encoding operations of the tokenization pipeline. For example, the pipeline engine can establish two tokenization pipelines, and can configure the tokenization pipelines such that the output of a tokenization engine of each pipeline is provided to a processing engine of the other pipeline to modify an input value before it is tokenized by a tokenization engine of the other pipeline. In some embodiments, token values from a first pipeline are used by a processing engine of a second pipeline to perform modulo addition on an input value or an output value of a token engine in the second pipeline. In some embodiments, token values from a first pipeline are used as encryption keys by a processing engine of a second pipeline to encrypt an input value or an output value of a token engine of the second pipeline.

In some embodiments, token values from a first pipeline are used by a processing engine of a second pipeline as initialization vectors to modify data values within the second pipeline. In some embodiments, the pipeline engine configures a value of a first pipeline to be provided to processing engines of multiple other pipelines to modify data in those other pipelines. Likewise, the pipeline engine can configure multiple pipelines to provide data values to a processing engine of a first pipeline, which is configured to use each of the multiple data values to modify a data value within the first data value. In yet other embodiments, the pipeline engine 215 can configure a value from a first tokenization pipeline to be used by a token engine of a second pipeline to select from between a set of token tables available to the token engine. For example, a token engine of a first tokenization pipeline can include or access a set of 100 token tables, and a value from a second tokenization pipeline can be used as an index to select among the 100 token tables for use in tokenizing data.

Each processing engine of a tokenization pipeline is configured to perform one or more associated encoding operations on one or more data values to produce a modified data value (or simply "modified value" hereinafter). If a processing engine requires more than one data value to perform the one or more encoding operations associated with the processing engine, the processing engine can wait until all data values are available before performing the one or more encoding operations. The processing engine can provide a modified value to another processing engine of the same tokenization pipeline or a different tokenization pipeline, or to a tokenization engine of the same tokenization pipeline or a different tokenization pipeline. Likewise, each tokenization engine of a tokenization pipeline is configured to perform one or more tokenization operations using one or more data values to produce a tokenized data value (or simply "token value" hereinafter). If a tokenization engine requires more than one data value to perform one or more tokenization operations, the tokenization engine can wait until all data values are available before performing the one or more tokenization operations. The tokenization engine can provide a token value to a processing engine or another tokenization engine of the same or a different tokenization pipeline.

As noted above, a processing engine or a tokenization engine may have to wait to receive all values required to perform encoding or tokenization operations associated with the processing engine or tokenization engine. In such embodiments, the performance of operations by a tokenization pipeline may pause while the performance of operations in other tokenization pipelines may continue. Each tokenization pipeline can be performed by a different hardware or software processor or processor core. By instantiating tokenization pipelines operating in parallel, the performance of the security server 110 is improved. Specifically, the data processing throughput of the security server is improved relative to a configuration of the security server that performs the encoding and tokenization operations described herein serially. Likewise, the allocation of hardware resources of the security server is improved by dedicating particular hardware resources (such as particular processing cores) to associated tokenization pipelines, decreasing the re-assignment of hardware resources to different encoding and tokenization operations that might otherwise be required if the encoding and tokenization operations were performed independently of the instantiated tokenization pipelines described herein. Finally, the processing capabilities of the security server configured to instantiate and execute tokenization pipelines in parallel are more efficient and take less time than would be required if the encoding and tokenization operations described herein are performed outside of the context of the parallel tokenization pipelines.

Figure 4:
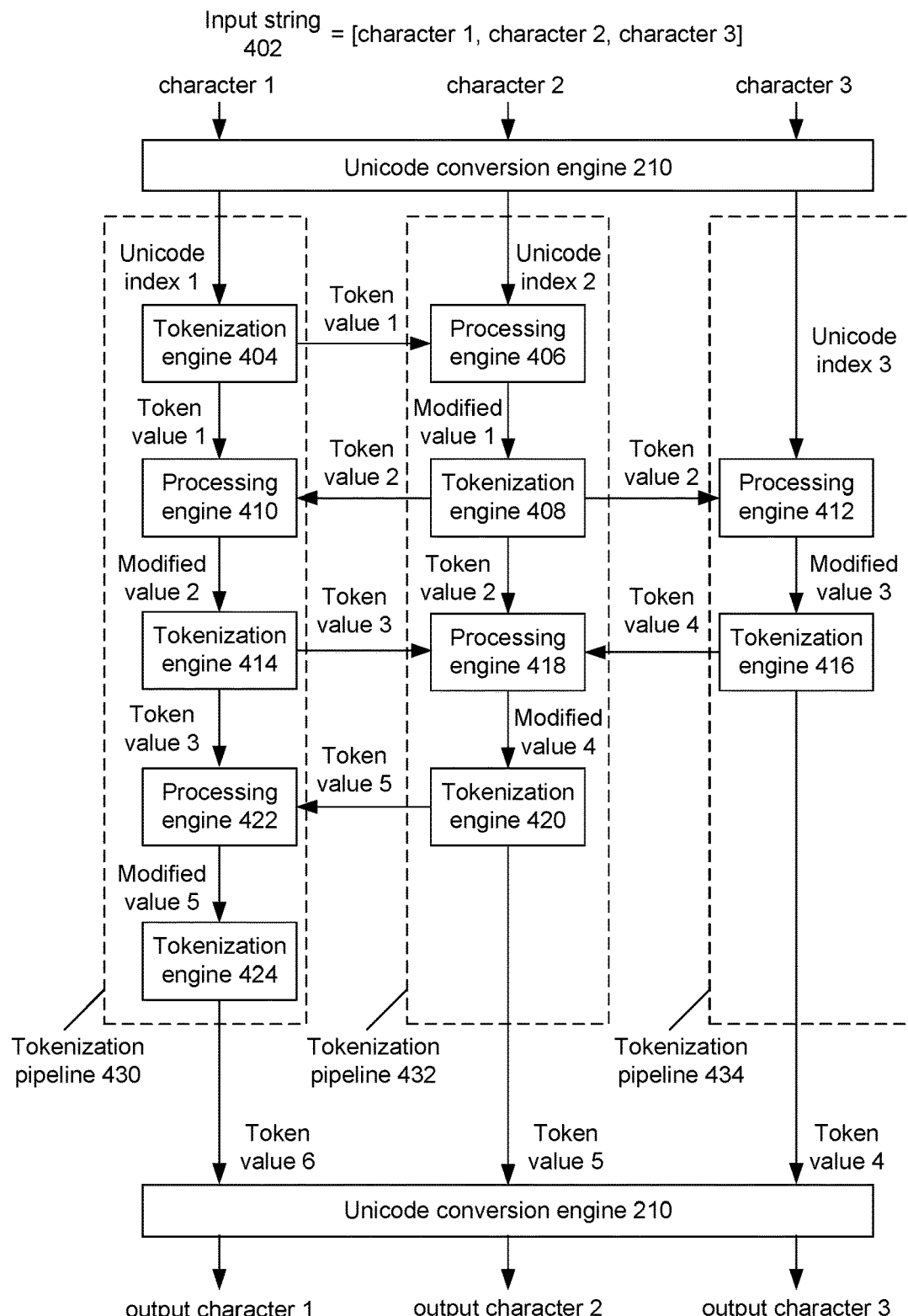
FIG. 4 illustrates an example Unicode tokenization operation in a parallel tokenization pipeline embodiment.

FIG. 4 illustrates an example Unicode tokenization operation in a parallel tokenization pipeline embodiment. In the embodiment of FIG. 4, three parallel tokenization pipelines are instantiated, a first tokenization pipeline 430, a second tokenization pipeline 432, and a third tokenization pipeline 434. Each of the three tokenization pipelines includes a number of tokenization engines and processing engines, each configured to perform encoding or tokenization operations based on data values generated within each tokenization pipeline and data values received from other tokenization pipelines. The configuration and number of tokenization pipelines in FIG. 4 is just one example of a parallel tokenization configuration, and is not limiting to other instantiations of tokenization pipelines or procedures that may be implemented according to the principles described herein.

In the embodiment of FIG. 4, an input string 402 (for instance, an input string received from the local endpoint 105*a*) to be tokenized includes three characters: character 1, character 2, and character 3. The characters are provided to the Unicode conversion engine 210, which converts their characters to the Unicode code value representations of these characters (e.g., Unicode index 1 is the Unicode code value corresponding to character 1, Unicode index 2 is the Unicode code value corresponding to character 2, and Unicode index 3 is the Unicode code value corresponding to character 3). Unicode index 1 is provided to the tokenization pipeline 430, Unicode index 2 is provided to the tokenization pipeline 432, and Unicode index 3 is provided to the tokenization pipeline 434.

Within the tokenization pipeline 430, the Unicode index 1 is provided to the tokenization engine 404, which tokenizes it to produce the token value 1. The token value 1 is provided to both the processing engine 406 of the tokenization pipeline 432 and to the processing engine 410 of the tokenization pipeline 430. The processing engine 406 performs an encoding operation (such as modulo addition) on the Unicode index 2 and the token value 1 to produce a modified value 1, which is provided to the tokenization engine 408 of the tokenization pipeline 432. The tokenization engine 408 tokenizes the modified value 1 to produce a token value 2, which is provided to the processing engine 410 of the tokenization pipeline 430, to the processing engine 412 of the tokenization pipeline 434, and to the processing engine 418 of the tokenization pipeline 432.

The processing engine 410 performs an encoding operation on the token value 1 and the token value 2, producing a modified value 2 which is provided to the tokenization engine 414 of the tokenization pipeline 430. In parallel with this encoding operation, the processing engine 412 performs an encoding operation on the Unicode index 3 and the token value 2 to produce a modified value 3, which is provided to the tokenization engine 416 of the tokenization pipeline 434. The tokenization engine 414 tokenizes the modified value 2 to produce a token value 3, which is provided to the processing engine 418 of the tokenization pipeline 432 and to the processing engine 422 of the tokenization pipeline 430. In parallel with this tokenization, the tokenization engine 416 tokenizes the modified value 3 to produce a token value 4, which is provided to the processing engine 418 of the tokenization pipeline 432, and which is also outputted from the tokenization pipeline 434.

The processing engine 418 performs an encoding operation on the token value 2, the token value 3, and the token value 4 to produce a modified value 4, which is provided to the tokenization 420 of the tokenization pipeline 432. The tokenization engine 420 tokenizes the modified value 4 to produce a token value 5, which is provided to the processing engine 422 of the tokenization pipeline 430, and which is also outputted from the tokenization pipeline 432. The processing engine 422 performs an encoding operation on the token value 3 and the token value 5 to produce a modified value 5, which is provided to the tokenization engine 424 of the tokenization pipeline 430. The tokenization engine 424 tokenizes the modified value 5 to produce a token value 6, which is outputted from the tokenization pipeline 430.

Token value 4, token value 5, and token value 6 are provided to the Unicode conversion engine 210, which outputs the output character 1, output character 2, and output character 3. For instance, output character 1 can be the character mapped to the Unicode code value represented by or equivalent to the token value 6, output character 2 can be the character mapped to the Unicode code value represented by or equivalent to the token value 5, and the output character 3 can be the character mapped to the Unicode code value represented by or equivalent to the token value 4. The output character 1, output character 2, and output character 3 collectively form the tokenized character string 440, which can be provided to the remote endpoint 105*b*.

In various embodiments, the processing engines within instantiated tokenization pipelines (such as the processing engines of FIG. 4) can perform the same or different encoding operations. Likewise, the tokenization engines within instantiated tokenization pipelines (such as the tokenization engines of FIG. 4) can perform the same or different tokenization operations, with the same or different token tables. For example, in some embodiments, all tokenization engines within instantiated tokenization pipelines use the same set of token tables; in some embodiments, all tokenization engines within the same tokenization pipeline use the same set of token tables, and each tokenization pipeline is associated with different sets of token tables; and in some embodiments, each tokenization engine uses a different set of token tables. Accordingly, the security server 110 can access a set of token tables from the token server 115 for all instantiated tokenization pipelines, can access a different set of token tables for each tokenization pipeline or each tokenization engine within each tokenization pipeline, or can access a set of token tables and can assign the accessed set of token tables to the tokenization pipelines and/or tokenization engines.

In some embodiments, such as the embodiment of FIG. 4, each tokenization pipeline can include different numbers of tokenization engines and processing engines, while in other embodiments, each tokenization pipeline can include the same number of tokenization engines and processing engines. In some embodiments, in order to satisfy a threshold level of security, the average number of tokenization engines and processing engines in each tokenization pipeline is inversely proportional to the number of tokenization pipelines instantiated. For example, for three instantiated tokenization pipelines, an average of 4 tokenization engines and processing engines may satisfy a threshold level of security, while for six instantiated tokenization pipelines, an average of 3 tokenization engines and processing engines may satisfy the threshold level of security. The threshold level of security, the average number of tokenization engines and processing engines within each tokenization pipeline, and the number of instantiated tokenization pipelines can be selected by a user or other entity corresponding to a system of FIG. 2, can be based on a type of data being tokenized, can be based on jurisdictional security requirement corresponding to a location of one or more of the systems of FIG. 2, or can be based on any other suitable criteria.

Figure 5:
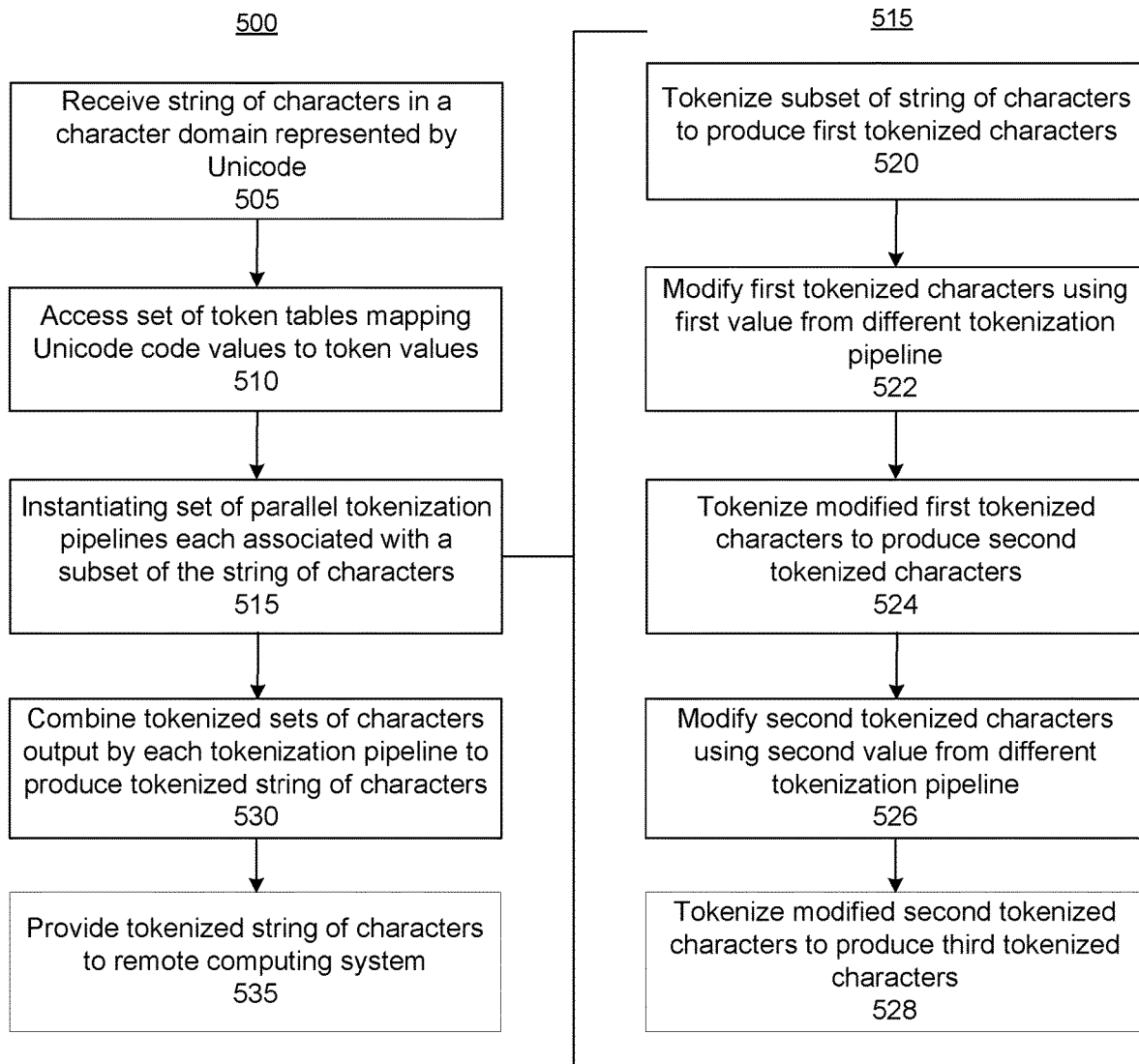
FIG. 5 is a flow chart illustrating a process for Unicode tokenization, according to one embodiment.

FIG. 5 is a flow chart illustrating a process of protecting Unicode data using parallel tokenization pipelines, according to one embodiment. It should be noted that the process illustrated in FIG. 5 is just one example of protecting Unicode data according to the principles described herein. In practice, other processes of protecting Unicode data can include additional, fewer, or different steps than illustrated in FIG. 5.

A string of characters in a character domain represented by Unicode is received 505 by a tokenization system (such as a central tokenization system, a security system, a server, a firewall system, and the like). A set of token tables mapping Unicode code values token values is accessed 510. Each token table maps a different token value to each of a set of Unicode code values. In some embodiments, the token tables are generated in advance of receiving the string of characters (and are stored, for instance, in a token table database or in a security system), while in other embodiments, the token tables are generated in response to receiving the data.

A set of parallel tokenization pipelines is instantiated 515, each tokenization pipeline configured to tokenize a different subset of the string of characters in parallel, simultaneously with, synchronously with, or in conjunction with one or more other tokenization pipelines. In one embodiment, a tokenization pipeline is configured to tokenize 520 a subset of the string of characters using a first token table of the accessed set of token tables to produce a first set of tokenized characters. For instance, Unicode code values corresponding to the subset of the string of characters are used to query the first token table, and token values mapped to the Unicode code values by the first token table are produced. The first set of tokenized characters include these produced token values.

The first set of tokenized characters are modified 522 using a first value from a different tokenization pipeline, such as a token value produced by a token table from the different tokenization pipeline. Modifying the first set of tokenized characters using the first value can include performing modulo addition on the first set of tokenized characters and the first value, combining the first set of tokenized characters and the first value, or any suitable mathematical or data operation on the first set of tokenized characters and the first value.

The modified first set of tokenized characters are tokenized 524 using a second token table of the accessed set of token tables to produce a second set of tokenized characters. The second set of tokenized characters are modified 526 using a second value from a different tokenization pipeline, and the modified second set of tokenized characters are tokenized 528 using a third token table of the accessed set of token tables to produce a third set of tokenized characters. The outputs of each tokenization pipeline are combined 530, for instance concatenated, to produce a tokenized string of characters. The tokenized string of characters can then be provided 535 to a remote computing system, for instance a receiving entity, a database, a security system, and the like.

Data Tokenization and Search in a Distributed Environment

Figure 6:
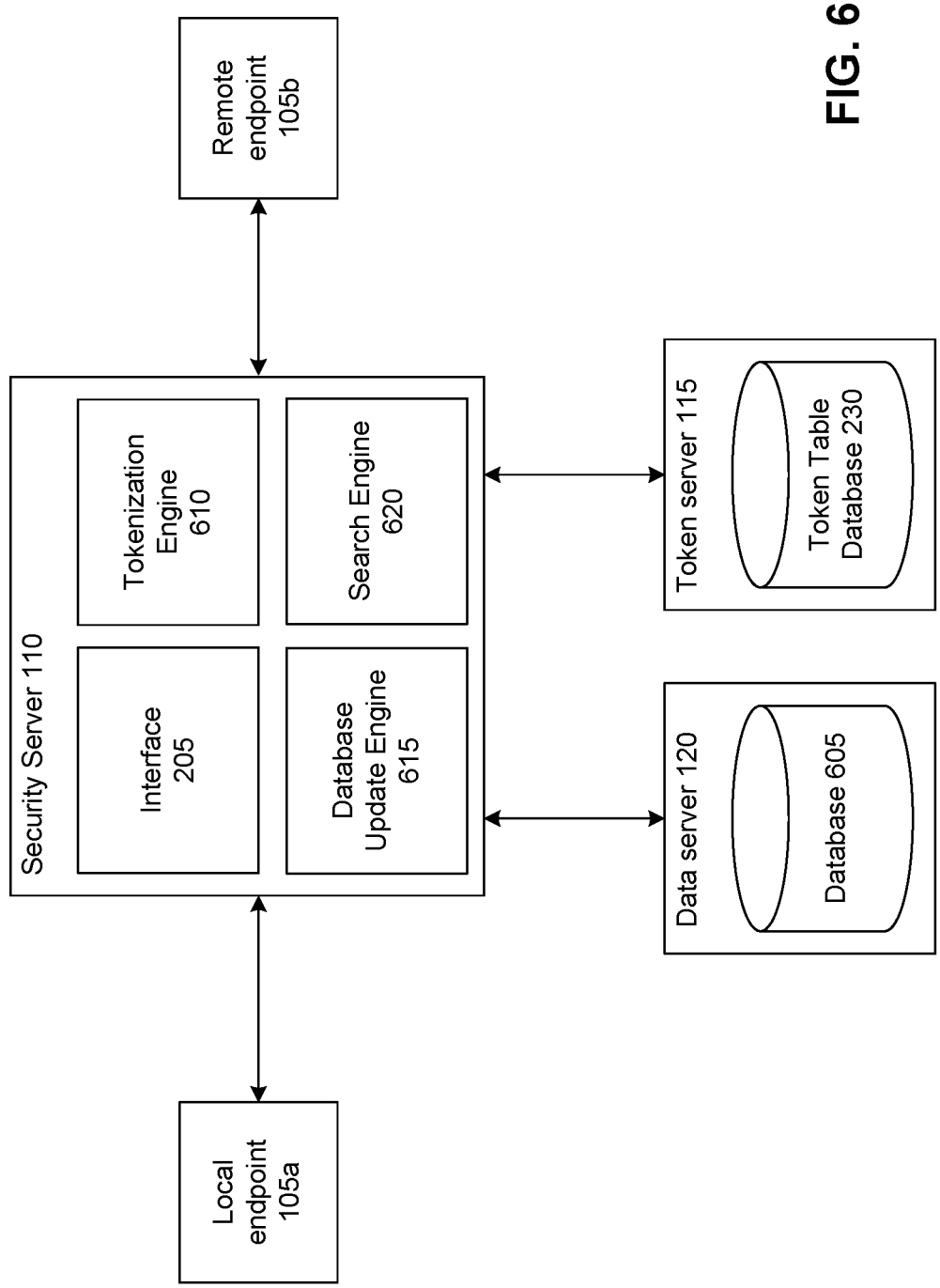
FIG. 6 illustrated dataflow within the distributed tokenization environment of FIG. 1, according to one embodiment.

FIG. 6 illustrated dataflow within the distributed tokenization environment of FIG. 1, according to one embodiment. In the embodiment of FIG. 6, the local endpoint 105a and remote endpoint 105b interface with the security server 110, for instance by providing data for storage within the data server 120 via the security server and by providing queries to the security server to query data stored within the data server. Likewise, the token server 115 generates, retrieves, and/or provides one or more token tables to the security server 110 for use in tokenizing data stored within the data server 120. The endpoints 105a and 105b and the token server 115 of FIG. 6 can be the same as or similar to the endpoints 105a and 105b and the token server 115 of FIG. 2 (for instance, the endpoints and token servers can be similar operations and enable similar functionality). Alternatively, the endpoints 105a and 105b and the token server 115 of FIG. 6 can differ in composition or functionality from the corresponding endpoints and token server of FIG. 2. Likewise, it should be noted that any of the components of FIG. 6 can be implemented within any of the other components of FIG. 6. For instance, the token server 115 may be implemented within the security server 110.

The data server 120 of FIG. 6 includes the database 605, which stores one or more data entries within database columns. As used herein, "data entries" can refer to database entries, data values stored within a database or other data storage, column entries, data words or tokens, and the like. Further, it should be noted that although reference is made herein to accessing, tokenizing, and searching data in a database for the purpose of simplicity, in practice, data within any suitable data storage system or mechanism can be tokenized and searched according to the principles described herein.

The security server 110 includes an interface 205, a tokenization engine 610, a database update engine 615, and a search engine 620. It should be noted that in other embodiments, additional, fewer, or different components are included within the security server 110 than those illustrated in FIG. 6. As discussed above, the interface 205 provides a communicative interface between the components of the security server 110, and between the security server and the other systems of the environment of FIG. 6.

The tokenization engine 610 tokenizes data entries stored within the database 605 of FIG. 6. For instance, the tokenization engine 610 accesses one or more token tables from the token server 115 via the interface 205, and uses the accessed token tables to tokenize the data entries. In some embodiments, the accessed token tables comprise token tables selected based on a column of data entries being tokenized, based on a type of data being tokenized, or based on a location within the database 605 in which the data entry resides, or based on any other suitable factor. For instance, for a data entry including 6 characters, the tokenization engine 610 can access token tables that map 6-character input values to token values. As described above, tokenizing a data entry includes querying an accessed token table with a data entry value to identify a token value mapped to the data entry value by the token table. A tokenized data entry is created by replacing the data entry value with the identified token value. For each data entry stored within the database 605 being tokenized, the tokenization engine 610 can use a same set of token tables, or can use different sets of token tables.

The tokenization engine 610 further tokenizes bigrams of each data entry within the database 605 being tokenized. As used herein, "bigram" refers to a pair of consecutive characters of the data entry. Although the tokenization operations described herein in the context of bigrams, in practice, trigrams or any number of consecutive characters (e.g., 3, 4, 5, or more) can be tokenized according to the principles described herein.

The tokenization engine 610 can token each bigram of a data entry by querying a token table with a value of the bigram to identify a token value mapped to the value of the bigram by the token table. In some embodiments, the token tables used to tokenize the bigrams include 2-character input values each mapped to a different token value. In such embodiments, a tokenized bigram is generated by identifying the token value mapped to a value of the bigram by the token table and replacing the value of the bigram with the identified token value.

It should be noted that in some embodiments, all database entries and associated bigrams of the entries are tokenized. Likewise, a subset of database entries and associated bigrams may be tokenized, for instance a subset of database columns. In some embodiments, database entries or columns associated with a data sensitivity can be tokenized, for instance all entries flagged as corresponding to an above-threshold sensitivity. Likewise, data entries or columns associated with a particular data format or type can be tokenized (such as social security numbers, or any data in a credit card number format). In some embodiments, database entries or columns selected by a user, such as a system administrator, or associated with a flag or status (e.g., indicating that the entries or columns should be tokenized) are tokenized.

The database update engine 615 modifies the database 605 to include the tokenized data entries and the associated tokenized bigrams. In some embodiments, the database update engine 615 modifies metadata of each data entry that was tokenized to include the tokenized data entry and the tokenized bigrams corresponding to the data entry. The tokenized data entry and tokenized bigrams may also be stored within a same database entry as the corresponding data entry. In some embodiments, the database update engine 615 modifies a portion of the database 605 to include the tokenized data entry and tokenized bigrams in a different location than the data entry, for instance in a different column or column entry. The database update engine 615 can also store the tokenized data entries and tokenized bigrams in a location outside the database 605, for instance in a different database or data storage system.

Figure 7:
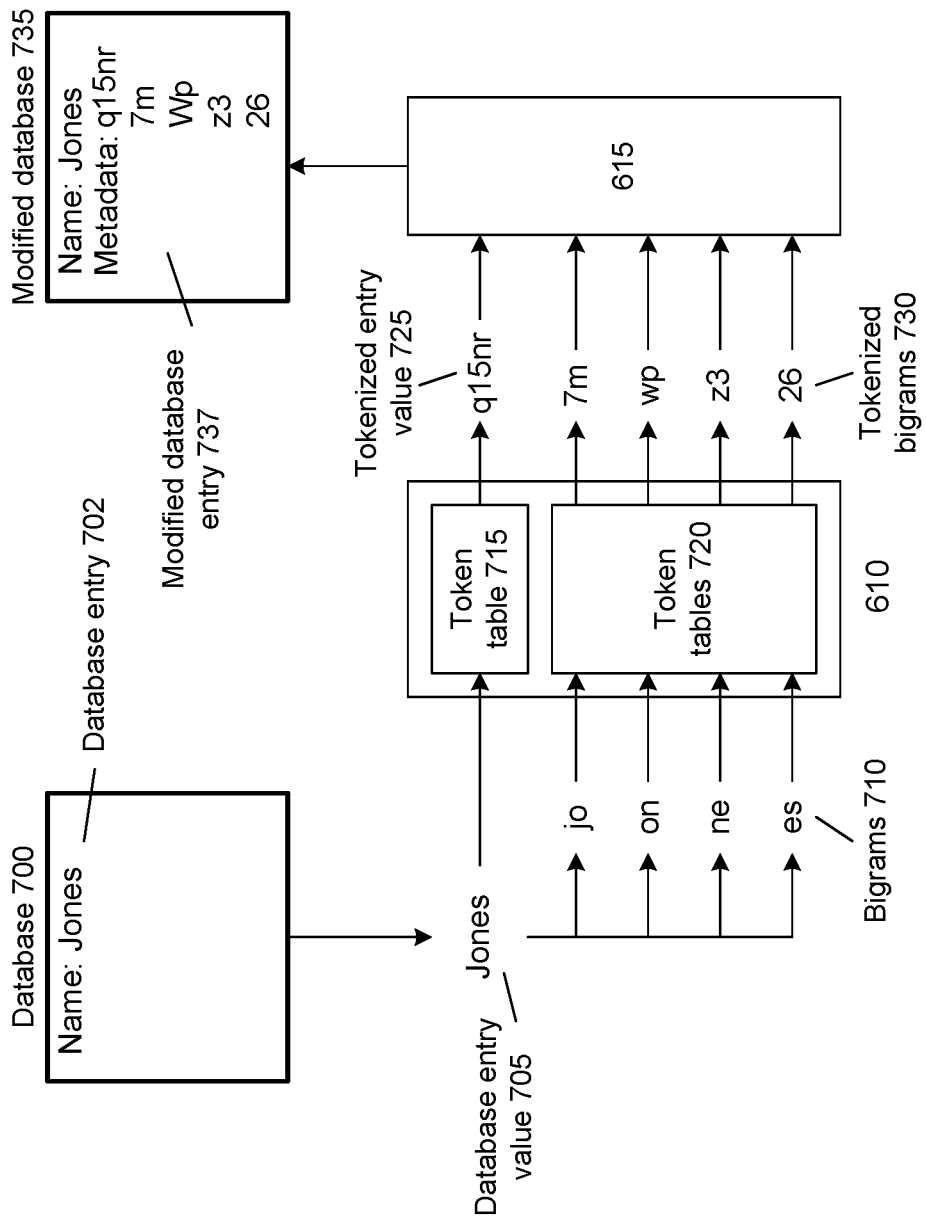
FIG. 7 illustrates an example of database entry and bigram tokenization, according to one embodiment.

FIG. 7 illustrates an example of database entry and bigram tokenization, according to one embodiment. In the embodiment of FIG. 7, a database 700 includes a data entry, database entry 702. The database entry value 705 of the database entry 702 is the name "Jones". The name "Jones" is separated into four bigrams 710: "jo", "on", "ne", and "es", representing each possible pair of consecutive letters of the name "Jones".

The tokenization engine 610 tokenizes the database entry value 705 and each bigram 710. For the database entry value 705, the tokenization engine 610 queries the token table 715 with the value "Jones", and identifies the token value "q15nr" as mapped to the value "Jones" by the token table. The value "Jones" is then replaced with the value "q15nr" to produce the tokenized entry value 725. Likewise, the tokenization engine 610 queries the token tables 720 with the bigrams 710 to produce tokenized bigrams 730. For instance, the value "jo" is mapped to the token value "7m" by the token tables 720, the value "on" is mapped to the token value "wp", the value "ne" is mapped to the token value "z3", and the value "es" is mapped to the token value "26". Accordingly, the tokenized bigrams 730 include the values "7m", "wp", "z3", and "26".

The database update engine 615 modifies the database entry 702 using the tokenized entry value 725 and the tokenized bigrams to produce the modified database entry 737 within a modified database 735. In particular, the metadata of the database entry 702 is modified to include the value "q15nr" (the tokenized entry value 725) and to include the values "7m", "wp", "z3", and "26" (the tokenized bigrams 730). Although the tokenized entry value 725 and the tokenized bigrams 730 are included within the same database entry as the name "Jones", as noted above, in other embodiments, the tokenized entry value and the tokenized bigrams are stored within a different database entry or column, or within a different database or data store altogether.

Returning to FIG. 6, the search engine 620 is configured to receive a search query term via the interface 205, for instance from the local endpoint 105a or the remote endpoint 105b. In some embodiments, the search query term is included within a search request, which identifies the database 605 or a portion of the database (e.g., one or more data columns or data tables within the database) to search. Likewise, in some embodiments, the received search query term can be included within a search request that includes a plurality of search query terms, and the search of the tokenized data within the database 605 can be performed according to the principles described herein. The remainder of the description will be limited to embodiments with single term search queries for the sake of simplicity.

The search engine 620 parses the received query term into bigrams. For instance, a first query bigram can include the first and second characters of the query term, a second query bigram can include the second and third characters of the query term, and so forth until the second to last character and last character combine to make a final query bigram. The search engine 620 provides the query bigrams to the tokenization engine 610 to tokenize the query bigrams.

The tokenization engine 610 tokenizes each query bigram by accessing a token table from the token server 115 and querying the token table with a value of the query bigram. The tokenization engine 610 identifies the token value mapped to the value of the query bigram by the token table to produce a tokenized query bigram. In some embodiments, the tokenization engine 610 accesses a token table that maps 2-character input values to token values, for instance 2-character token values (though in other embodiments, the number of characters in each token value can be a different than 2).

The search engine 620 queries the database 605 using the tokenized query bigrams. To query the database 605 with a tokenized query bigram, the search engine 620 identifies each data entry or data entry of the database that is associated with a tokenized bigram that matches the tokenized query bigram, for instance by comparing the tokenized query bigram to each tokenized bigram associated with a data entry to determine if any of the tokenized bigrams associated with the data entry match the tokenized query bigram.

In some embodiments, all data entries associated with tokenized bigrams that match one or more of the tokenized query bigrams are identified by the search engine 620 as relevant to the search query. In some embodiments, only a threshold number of data entries are identified by the search engine 620 as relevant to the search query, for instance the data entries that are associated with the most tokenized bigrams (e.g., 2 or more tokenized bigrams that match at least one tokenized query bigram, 3 or more, etc.) or associated with a highest percentage of tokenized bigrams that match one or more of the tokenized query bigrams. In some embodiments, all data entries associated with tokenized bigrams that match a threshold percentage of the tokenized query bigrams are identified as relevant to the search query.

The search engine 620, upon identifying a set of data entries of the database 605 that are associated with tokenized bigrams that match one or more of the tokenized query bigrams (and thus that are determined to be relevant to the search query), accesses one or more tokenized data entries associated with the identified set of data entries. For instance, for each data entry identified by the search engine 620, a corresponding tokenized data entry can be accessed from the database 605. In some embodiments, accessing a tokenized data entry includes querying the metadata associated with an identified data entry, querying a column or portion of the database 602 that corresponds to the identified data entry, and the like. In response to accessing the tokenizing data entries associated with the identified data entries, the search engine 620 can present the tokenized data entries as search results, for instance to a client device or endpoint 105a or 105b associated with the search query.

Figure 8:
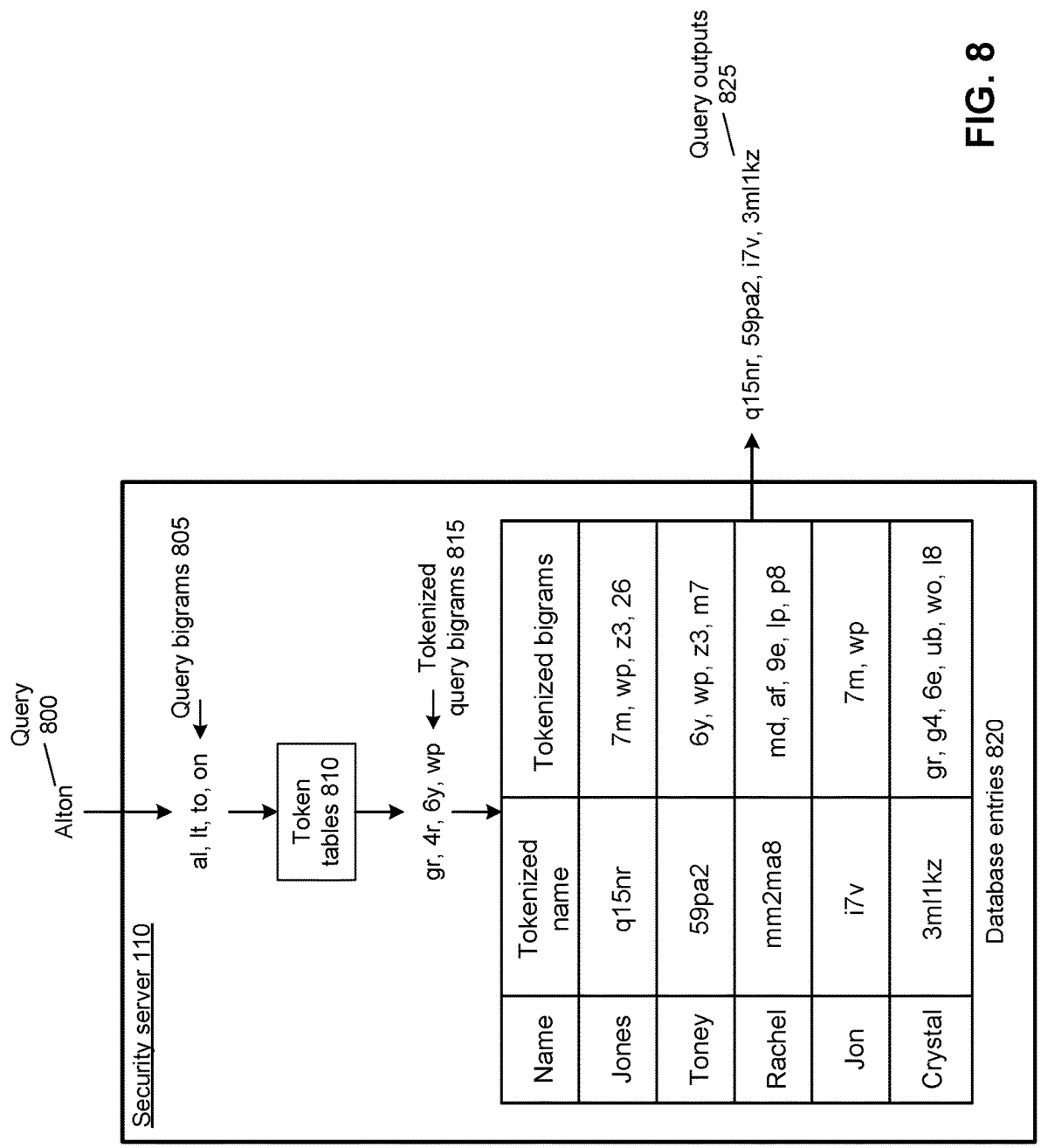
FIG. 8 illustrates an example of searching a tokenized database, according to one embodiment.

FIG. 8 illustrates an example of searching a tokenized database, according to one embodiment. In the embodiment of FIG. 8, a query term 800 is received by the security server 110. The query term is "Alton". The security server 110, for instance via the search engine 620, parses the term "Alton" into query bigrams 805, specifically the bigrams "al", "lt", "to", and "on". The security server 110 then accesses a set of token tables 810, for instance from the token server 115.

The query bigrams 805 are tokenized using the set of token tables 810, for instance by the tokenization engine 610, producing a set of tokenized query bigrams 815. In order to tokenize the query bigram "al", for instance, the security server 110 can query a token table from the set of token tables 810 using the value "al" to identify the token value mapped to the value of "al" by the set of token tables, in this case the token value "gr". Accordingly, the tokenized query bigrams 815 representative of the query bigrams 805 are "gr" "4r" "6y", and "wp".

The security server 110, for instance via the search engine 620, queries the database entries 820 with the tokenized query bigrams 815. In the embodiment of FIG. 8, the database entries 820 are illustrated within the security server 110, but in practice the database entries may be located within the data server 120 or within any other suitable entity. The database entries 820 include five names, each corresponding to a tokenized entry (the "tokenized name" column of the database entries 820). Likewise, each name within a database entry corresponds to a set of tokenized bigrams (the "tokenized bigrams" column of the database entries 820).

The security server 110, for instance via the search engine 620, identifies all data entries that correspond to at least one tokenized bigram that matches at least one of the tokenized query bigrams 815. In this case, the security server 110 determines that the data entry "Jones" corresponds to the tokenized bigram "wp", which matches the tokenized query bigram "wp". Likewise, the security server 110 determines that the data entries "Toney", "Jon", and "Crystal" correspond to tokenized bigrams that match one or more of the tokenized query bigrams. In response to identifying the data entries "Jones", "Toney", "Jon", and "Crystal", the security server 110 outputs the tokenized data entries corresponding to these data entries (e.g., the tokenized names "q15nr", "59pa2", "i7v", and "3ml1kz") as query outputs 825. The query outputs 825 can then be provided to a client device for display.

Figure 9:
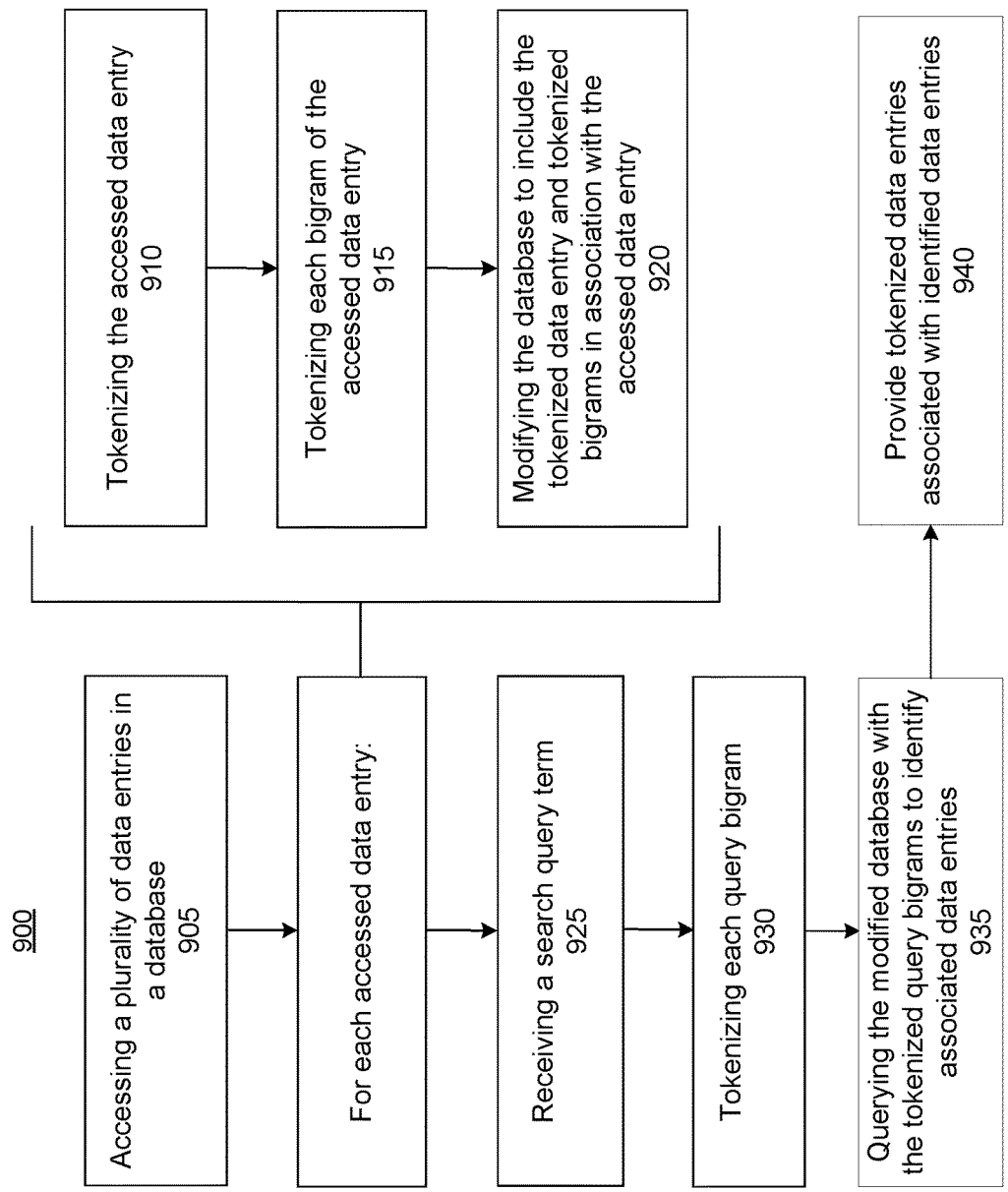
FIG. 9 is a flow chart illustrating a process of tokenizing and searching data in a database, according to one embodiment.

FIG. 9 is a flow chart illustrating a process of tokenizing and searching data in a database, according to one embodiment. It should be noted that the process illustrated in FIG. 9 is just one example of tokenizing and searching data in a database according to the principles described herein. In practice, other processes of tokenizing and searching data in a database can include additional, fewer, or different steps than illustrated in FIG. 9.

A plurality of data entries in a database are accessed 905. In some embodiments, this includes all database entries, while in other embodiments, a subset of data entries or columns of the database are accessed. Likewise, data entries from a data source other than a database may be accessed.

For each accessed data entry, the data entry itself is tokenized 910. For instance, the data value of the data entry is used as an input value to query a token table. A token value mapped to the data value of the data entry by the token table is identified, producing a tokenized data entry (e.g., the tokenized data entry comprises the identified token value). The accessed data entry is also parsed into bigrams (e.g., a first bigram including a first and second character of the accessed data entry, a second bigram including a second and third character of the accessed data entry, and so forth until the second to last and last character of the accessed data entry). Each bigram is then tokenized, for instance by querying a token table with a value of the bigram to identify a token value mapped to the value of the bigram by the token table.

The database is modified 920 to include the tokenized data entry and the tokenized bigrams in associated with the accessed data entry. In some embodiments, the tokenized data entry and the tokenized bigrams are stored in a same data entry as the accessed data entry, for instance within metadata associated with the data entry. In other embodiments, the tokenized data entry and the tokenized bigrams are stored at a different location (e.g., a different database entry or column) that corresponds to the accessed data entry (e.g., a dedicated column corresponding to the column that includes the accessed data entry). In some embodiments, the tokenized data entry and the tokenized bigrams replace the accessed data entry within the database, such as that the accessed data entry is no longer stored within the database in plaintext.

After the accessed data entries are tokenized, a search query term is received 925, for instance from a user requesting a search of the database. The search query term is parsed into query bigrams, and each query bigram is tokenized 930, for instance using the same token tables used to tokenize the bigrams of the accessed data entry. The modified database is queried 935 with the tokenized query bigrams to identify data entries associated with the tokenized query bigrams.

For instance, data entries associated with tokenized bigrams that match one or more of the tokenized query bigrams are identified. The tokenized data entries associated with the identified data entries are provided 940 as search query results, for instance to a device associated with a user requesting the query.

The method of tokenized data access and search described herein beneficially enables tokenized data to be searched without detokenizing the data. Although the examples of (for instance) FIG. 8 and elsewhere herein are described in the context of database that include plaintext data entries, in practice, tokenized data within a database can be searched without requiring plaintext data to be present within the database. In other words, although the example of FIG. 8 illustrates plaintext names within the database entries of FIG. 8, the query outputs include tokenized data, and do not include plaintext data, thus protecting the plaintext data from unprotected exposure.

Additional Considerations

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method comprising:
   accessing, by a security server, a plurality of data entries in a database, each data entry comprising a plurality of bytes;
   for each accessed data entry:
      tokenizing, by the security server, the accessed data entry by querying a set of token tables with a value of the plurality of bytes to identify a first token value mapped to the value of the plurality of bytes by the set of token tables to produce a tokenized data entry;
      for each bigram of a plurality of bigrams of the accessed data entry, tokenizing, by the security server, the bigram by querying the set of token tables with a value of the pair of consecutive bytes of the bigram to identify a second token value mapped to the value of the pair of consecutive bytes of the bigram by the set of token tables to produce an associated tokenized bigram, wherein a first byte and a last byte of the accessed data entry are included within one bigram of the plurality of bigrams and wherein each byte between the first byte and the last byte of the accessed data entry are included within two bigrams of the plurality of bigrams; and
      modifying, by the security server, the database to include the tokenized data entry and each associated tokenized bigram in conjunction with the accessed data entry;
   receiving, by the security server, a search query term comprising a plurality of query bytes from a user;
   tokenizing, by the security server, each query bigram comprising a pair of consecutive query bytes such that each query bigram includes a byte in common with at least one other query bigram using the set of token tables to produce a set of tokenized query bigrams;
   querying, by the security server, the modified database with each tokenized query bigram to identify data entries associated with at least one tokenized bigram that matches at least one of the tokenized query bigrams; and
   providing, by the security server, a set of tokenized data entries associated with the identified data entries.

2. The method of claim 1, wherein each data entry comprises a word of data stored within a database column.

3. The method of claim 1, wherein each token table of the set of token tables maps each possible input value for a fixed input length to a different token value.

4. The method of claim 3, wherein tokenizing the accessed data entry comprises querying a first subset of the set of token tables mapping input values of a first length equal to a length of the plurality of bytes to token values, and wherein tokenizing each bigram comprising querying a second subset of the set of table tables mapping input values of a second length equal to two bytes to token values.

5. The method of claim 1, wherein modifying the database comprises storing, for an accessed data entry, the associated tokenized data entry and the associated tokenized bigrams in metadata associated with the accessed data entry.

6. The method of claim 1, wherein modifying the database comprises storing, for an accessed data entry, the associated tokenized data entry and the associated tokenized bigrams in a database column entry associated with the accessed data entry.

7. The method of claim 1, wherein tokenizing a query bigram comprises querying a token table of the set of token tables with a value of the pair of consecutive bytes of the query bigram to identify a token value mapped to the value of the pair of consecutive bytes of the query bigram by the token table, the token value comprising the tokenized query bigram corresponding to the query bigram.

8. The method of claim 1, wherein each identified data entry comprises a data entry associated with an above-threshold number of tokenized bigrams that match the tokenized query bigrams.

9. The method of claim 1, wherein providing the set of tokenized data entries comprises providing the tokenized data entries corresponding to a threshold number of identified data entries associated with tokenized bigrams that best match the tokenized query bigrams.

10. The method of claim 1, wherein providing the set of tokenized data entries comprises providing all tokenized data entries corresponding to identified data entries associated with at least a threshold number of tokenized bigrams that match the tokenized query bigrams.

11. A non-transitory computer-readable storage medium storing executable instructions that, when executed by a processor of a security server, cause the security server to perform steps comprising:
    accessing, by the security server, a plurality of data entries in a database, each data entry comprising a plurality of bytes;
    for each accessed data entry:
        tokenizing, by the security server, the accessed data entry by querying a set of token tables with a value of the plurality of bytes to identify a first token value mapped to the value of the plurality of bytes by the set of token tables to produce a tokenized data entry;
        for each bigram of a plurality of bigrams of the accessed data entry, tokenizing, by the security server, the bigram by querying the set of token tables with a value of the pair of consecutive bytes of the bigram to identify a second token value mapped to the value of the pair of consecutive bytes of the bigram by the set of token tables to produce an associated tokenized bigram, wherein a first byte and a last byte of the accessed data entry are included within one bigram of the plurality of bigrams and wherein each byte between the first byte and the last byte of the accessed data entry are included within two bigrams of the plurality of bigrams; and
        modifying, by the security server, the database to include the tokenized data entry and each associated tokenized bigram in conjunction with the accessed data entry;
    receiving, by the security server, a search query term comprising a plurality of query bytes from a user;
    tokenizing, by the security server, each query bigram comprising a pair of consecutive query bytes using the set of token tables to produce a set of tokenized query bigrams;
    querying, by the security server, the modified database with each tokenized query bigram such that each query bigram includes a byte in common with at least one other query bigram to identify data entries associated with at least one tokenized bigram that matches at least one of the tokenized query bigrams; and
    providing, by the security server, a set of tokenized data entries associated with the identified data entries.

12. The non-transitory computer-readable storage medium of claim 11, wherein each data entry comprises a word of data stored within a database column.

13. The non-transitory computer-readable storage medium of claim 11, wherein each token table of the set of token tables maps each possible input value for a fixed input length to a different token value.

14. The non-transitory computer-readable storage medium of claim 13, wherein tokenizing the accessed data entry comprises querying a first subset of the set of token tables mapping input values of a first length equal to a length of the plurality of bytes to token values, and wherein tokenizing each bigram comprising querying a second subset of the set of table tables mapping input values of a second length equal to two bytes to token values.

15. The non-transitory computer-readable storage medium of claim 11, wherein modifying the database comprises storing, for an accessed data entry, the associated tokenized data entry and the associated tokenized bigrams in metadata associated with the accessed data entry.

16. The non-transitory computer-readable storage medium of claim 11, wherein modifying the database comprises storing, for an accessed data entry, the associated tokenized data entry and the associated tokenized bigrams in a database column entry associated with the accessed data entry.

17. The non-transitory computer-readable storage medium of claim 11, wherein tokenizing a query bigram comprises querying a token table of the set of token tables with a value of the pair of consecutive bytes of the query bigram to identify a token value mapped to the value of the pair of consecutive bytes of the query bigram by the token table, the token value comprising the tokenized query bigram corresponding to the query bigram.

18. The non-transitory computer-readable storage medium of claim 11, wherein each identified data entry comprises a data entry associated with an above-threshold number of tokenized bigrams that match the tokenized query bigrams.

19. The non-transitory computer-readable storage medium of claim 11, wherein providing the set of tokenized data entries comprises providing the tokenized data entries corresponding to a threshold number of identified data entries associated with tokenized bigrams that best match the tokenized query bigrams.

20. The non-transitory computer-readable storage medium of claim 11, wherein providing the set of tokenized data entries comprises providing all tokenized data entries corresponding to identified data entries associated with at least a threshold number of tokenized bigrams that match the tokenized query bigrams.

21. A security server comprising:
    a hardware processor; and
    a non-transitory computer-readable storage medium storing executable instructions that, when executed by the hardware processor, cause the security server to perform steps comprising:

accessing, by a security server, a plurality of data entries in a database, each data entry comprising a plurality of bytes;

for each accessed data entry:

tokenizing, by the security server, the accessed data entry by querying a set of token tables with a value of the plurality of bytes to identify a first token value mapped to the value of the plurality of bytes by the set of token tables to produce a tokenized data entry;

for each bigram of a plurality of bigrams of the accessed data entry, tokenizing, by the security server, the bigram by querying the set of token tables with a value of the pair of consecutive bytes of the bigram to identify a second token value mapped to the value of the pair of consecutive bytes of the bigram by the set of token tables to produce an associated tokenized bigram, wherein a first byte and a last byte of the accessed data entry are included within one bigram of the plurality of bigrams and wherein each byte between the first byte and the last byte of the accessed data entry are included within two bigrams of the plurality of bigrams; and modifying, by the security server, the database to include the tokenized data entry and each associated tokenized bigram in conjunction with the accessed data entry;

receiving, by the security server, a search query term comprising a plurality of query bytes from a user;

tokenizing, by the security server, each query bigram comprising a pair of consecutive query bytes using the set of token tables to produce a set of tokenized query bigrams;

querying, by the security server, the modified database with each tokenized query bigram such that each query bigram includes a byte in common with at least one other query bigram to identify data entries associated with at least one tokenized bigram that matches at least one of the tokenized query bigrams; and providing, by the security server, a set of tokenized data entries associated with the identified data entries.

* * * * *